United States Patent
McAleenan et al.

(10) Patent No.: US 11,067,388 B2
(45) Date of Patent: Jul. 20, 2021

(54) 3D ASSET INSPECTION

(71) Applicant: SUBSITE, LLC, Perry, OK (US)

(72) Inventors: G. Christopher McAleenan, Boulder, CO (US); Matthew T. Wicke, Aurora, CO (US)

(73) Assignee: The Charles Machine Works, Inc., Perry, OK (US)

( * ) Notice: Subject to any disclaimer, the term of this patent is extended or adjusted under 35 U.S.C. 154(b) by 0 days.

(21) Appl. No.: 16/390,243

(22) Filed: Apr. 22, 2019

(65) Prior Publication Data

US 2019/0242696 A1 Aug. 8, 2019

Related U.S. Application Data

(63) Continuation of application No. 15/050,898, filed on Feb. 23, 2016, now abandoned.

(60) Provisional application No. 62/119,788, filed on Feb. 23, 2015.

(51) Int. Cl.
| | | |
|---|---|---|
| *G01B 11/24* | (2006.01) | |
| *G01B 11/00* | (2006.01) | |
| *G01S 17/86* | (2020.01) | |
| *G01S 17/894* | (2020.01) | |

(52) U.S. Cl.
CPC ............ *G01B 11/24* (2013.01); *G01B 11/002* (2013.01); *G01S 17/86* (2020.01); *G01S 17/894* (2020.01)

(58) Field of Classification Search
None
See application file for complete search history.

(56) References Cited

U.S. PATENT DOCUMENTS

| | | | | |
|---|---|---|---|---|
| 5,107,705 A | * | 4/1992 | Wraight | E21B 45/00 73/152.03 |
| 2003/0038756 A1 | * | 2/2003 | Blume | H04N 5/23238 345/36 |
| 2003/0038814 A1 | * | 2/2003 | Blume | G03B 37/04 345/585 |

(Continued)

OTHER PUBLICATIONS

"Multi-Level Surface Maps for Outdoor Terrain Mapping and Loop Closing" by R. Triebel, P. Pfaff and W. Burgard; IEEE/RSJ International Conference on Intelligent Robots and Systems, 2006.*

(Continued)

*Primary Examiner* — Dakshesh D Parikh
(74) *Attorney, Agent, or Firm* — Tomlinson McKinstry, P.C.

(57) ABSTRACT

Systems and methods for physical asset inspection are provided. According to one embodiment, a probe is positioned to multiple data capture positions with reference to a physical asset. For each position: odometry data is obtained from an encoder and/or an IMU; a 2D image is captured by a camera; a 3D sensor data frame is captured by a 3D sensor, having a view plane overlapping that of the camera; the odometry data, the 2D image and the 3D sensor data frame are linked and associated with a physical point in real-world space based on the odometry data; and switching between 2D and 3D views within the collected data is facilitated by forming a set of points containing both 2D and 3D data by performing UV mapping based on a known positioning of the camera relative to the 3D sensor.

10 Claims, 8 Drawing Sheets

(56) References Cited

U.S. PATENT DOCUMENTS

| | | | |
|---|---|---|---|
| 2008/0068601 A1* | 3/2008 | Thayer | G01B 11/24 |
| | | | 356/241.3 |
| 2009/0015584 A1 | 1/2009 | Shimizu | |
| 2012/0169841 A1* | 7/2012 | Chemali | E21B 47/002 |
| | | | 348/36 |
| 2013/0325244 A1* | 12/2013 | Wang | G06T 11/00 |
| | | | 701/26 |
| 2013/0345876 A1 | 12/2013 | Rudakevych | |

OTHER PUBLICATIONS

"3D Models from Extended Uncalibrated Video Sequences: Addressing Key-frame Selection and Projective Drift" by J. Repko and M. Pollefeys; Fifth International Conference on three-dimensional Digital Imaging and Modeling, 2005.*

R. Triebel, P. Pfaff, and W. Burgard, "Multi-Level Surface Maps for Outdoor Terrain Mapping and Loop Closing", article, 2006, 7 pages, Freiburg, Germany.

J. Repko and M. Pollefeys, "3D Models from Extended Uncalibrated Video Sequences: Addressing Key-Frame Selection and Projective Drift", 2005, article, 8 pages, North Carolina, USA.

* cited by examiner

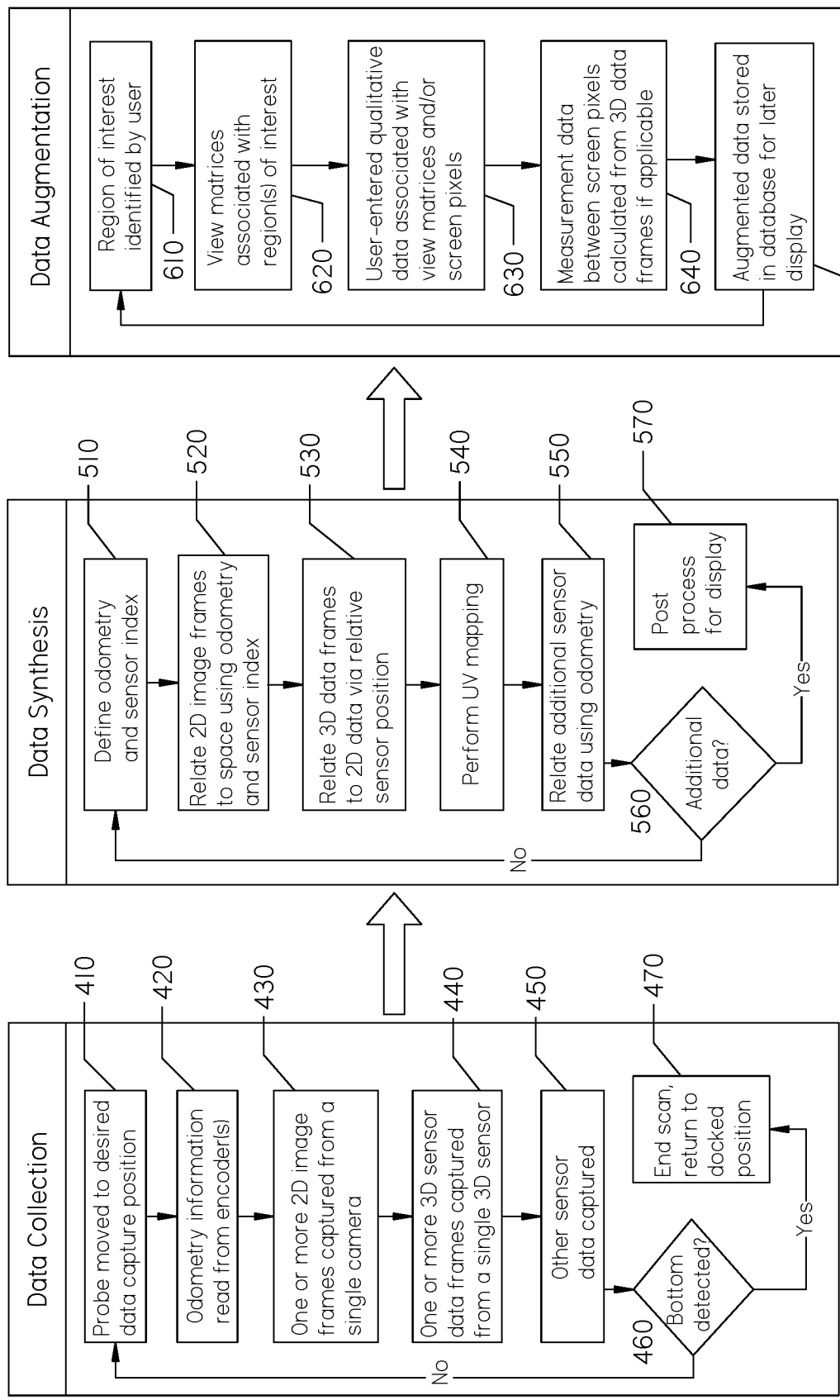

FIG. 9

3D ASSET INSPECTION

FIELD

Embodiments of the present invention generally relate to the fields of three-dimensional (3D) imaging and inspection of physical assets. In particular, various embodiments relate to systems and methods for vertical structure inspection based on 3D data generated based on depth sensor information and 2D data generated based on imaging data captured by one or more video cameras.

DESCRIPTION OF THE RELATED ART

Conventional methods of inspecting vertical structures, such as manholes, do not capture qualitative and quantitative inspection data in a way that is consistent, repeatable, and complete. One such conventional inspection method is manned entry of the structure relying on tape measure and note taking for data collection, which often leaves out critical information. Another such conventional inspection method relies on a human operating a camera attached to a pole from above the structure, also leaving out critical information. Another such conventional inspection method utilizes a robot with one or more panoramic cameras for data collection, which often results in distorted images and/or incomplete data.

SUMMARY

Systems and methods are described for physical asset inspection. According to one embodiment, a probe is positioned to multiple data capture positions with reference to a physical asset. For each of the data capture positions: (i) data is collected regarding the physical asset by performing a data collection process including: (a) reading, by a central processing unit (CPU) of the probe, odometry data from one or more of an encoder and an inertial measurement unit (IMU) attached to or integrated with the probe; (b) capturing, by a camera attached to or integrated with the probe having a first view plane, one or more two-dimensional (2D) images; and (c) capturing, by a three-dimensional (3D) sensor attached to or integrated with the probe and having a second view plane overlapping that of the first view plane, one or more 3D sensor data frames; and (ii) performing a data synthesis process including: (d) linking, by the CPU, the odometry data, the one or more 2D images and the one or more 3D sensor data frames; (e) associating, by the CPU, the one or more 2D images and the one or more 3D sensor data frames with a physical point in real-world space based on the odometry data; and (f) facilitating subsequent ability on behalf of a user navigating the collected data to switch between a 2D view and a 3D view by forming, by the CPU, a set of points each containing both 3D data and 2D data by performing UV mapping based on the one or more 2D images, the one or more 3D sensor data frames and based on a known physical geometry of positioning of the camera relative to the 3D sensor.

BRIEF DESCRIPTION OF THE DRAWINGS

Embodiments of the present invention are illustrated by way of example, and not by way of limitation, in the figures of the accompanying drawings and in which like reference numerals refer to similar elements and in which:

FIG. 4 is a flow diagram illustrating data collection processing in accordance with an embodiment of the present invention.

FIG. 5 is a flow diagram illustrating data synthesis processing in accordance with an embodiment of the present invention.

FIG. 6 is a flow diagram illustrating data augmentation processing in accordance with an embodiment of the present invention.

FIG. 9 illustrates a user interface screen shot in accordance with an embodiment of the present invention.

DETAILED DESCRIPTION

Figure 1:
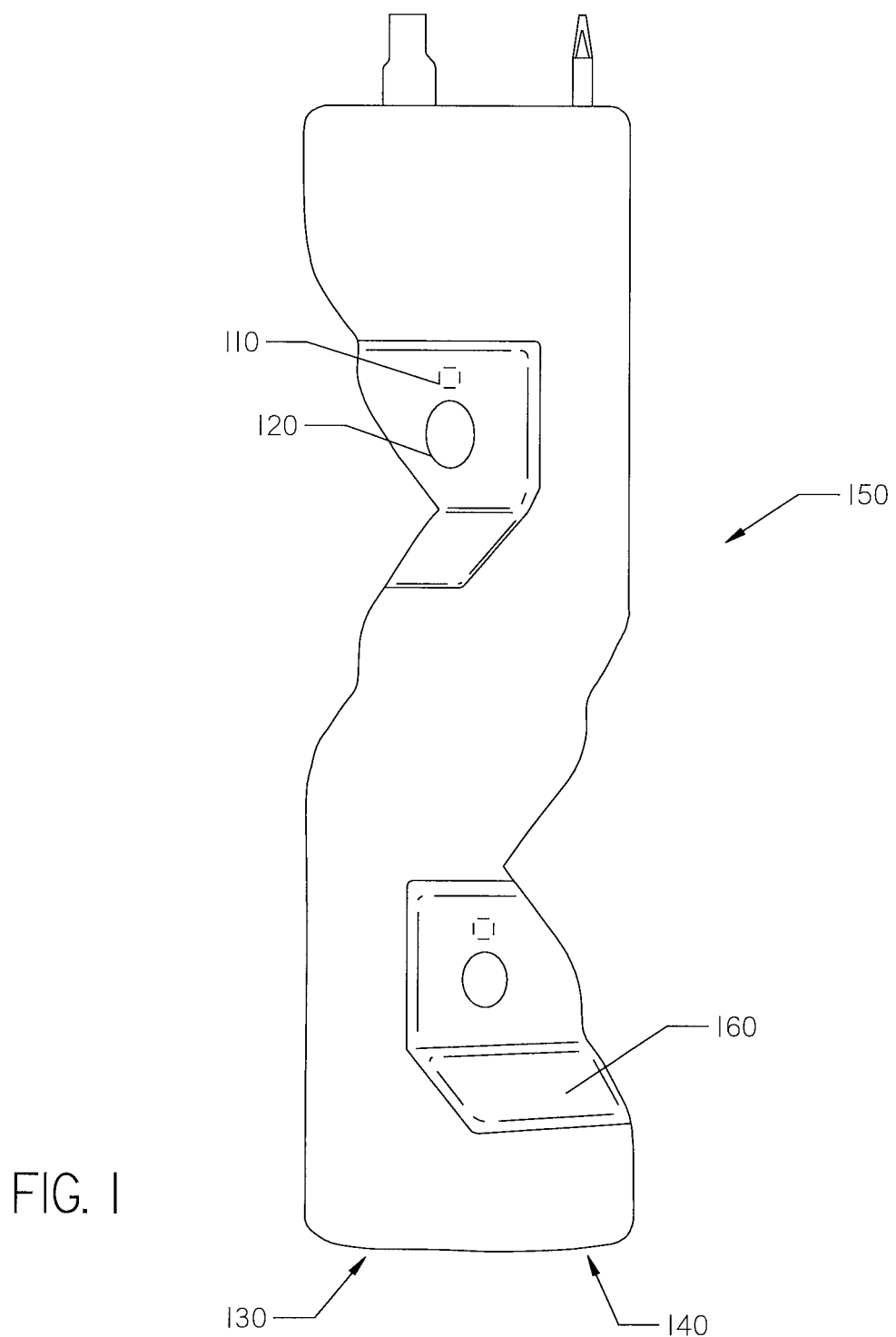
FIG. 1 is a perspective view of an asset inspection robot in accordance with an embodiment of the present invention.

Systems and methods are described for physical asset inspection. According to one embodiment, designed to assess manhole conditions, a tethered robot includes one or more 2D cameras, one or more 3D depth sensors, a GPS sensor, a gas sensor and a custom software package. The 2D and 3D sensors capture visual data of a structure, the GPS sensor orients the robot to the physical world, and the software creates an immersive representation of this data for assessment purposes.

While various embodiments of the present invention are described with reference to a robot with winch control to provide vertical motion, it is to be understood that the 2D and 3D data capturing methodologies and software representation technologies described herein are equally applicable to alternative transportation bodies and mechanisms. As will be appreciated by those skilled in the art, the physical asset inspection functionality may be housed in whatever transportation body is most appropriate for the particular physical asset being inspected. For example, automated guided vehicles, such as quadracopters, aerial or submersible drones or other remote flying or underwater vehicles may be used for inspection of telecommunications structures (e.g., base tower stations, antennas, masts, latticed towers and cell phone towers) and commercial/industrial structures (e.g., skyscrapers, bridges, platforms, water tanks, water processing systems, factories, oil rigs, solar paneling and other civil infrastructure). Alternatively, the inspection technologies described herein may be incorporated or integrated within crawling, legged, line following or wheeled robots. Therefore, the specific examples of transportation bodies presented and/or described herein are not intended to be limiting and are merely exemplary. In some embodiments, the inspection technologies described herein may be attached to existing commercial equipment, such as closed-circuit television (CCTV) sewer cameras to augment data collection, for example.

Furthermore, while, for convenience, various embodiments of the present invention may be described with reference to fixed-position sensors and cameras relative to the probe body, it is to be understood that in alternative embodiments the sensors and/or cameras may be mounted on or off the central axis and may rotate about or relative to the body of the probe.

In the following description, numerous specific details are set forth in order to provide a thorough understanding of embodiments of the present invention. It will be apparent, however, to one skilled in the art that embodiments of the present invention may be practiced without some of these specific details. In other instances, well-known structures and devices are shown in block diagram form.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, the steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). Moreover, embodiments of the present invention may also be downloaded as one or more computer program products, wherein the program may be transferred from a remote computer to a requesting computer by way of data signals embodied in a carrier wave or other propagation medium via a communication link (e.g., a modem or network connection).

In various embodiments, the article(s) of manufacture (e.g., the computer program products) containing the computer programming code may be used by executing the code directly from the machine-readable storage medium or by copying the code from the machine-readable storage medium into another machine-readable storage medium (e.g., a hard disk, RAM, etc.) or by transmitting the code on a network for remote execution. Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Notably, while embodiments of the present invention may be described using modular programming terminology, the code implementing various embodiments of the present invention is not so limited. For example, the code may reflect other programming paradigms and/or styles, including, but not limited to object-oriented programming (OOP), agent oriented programming, aspect-oriented programming, attribute-oriented programming (@OP), automatic programming, dataflow programming, declarative programming, functional programming, event-driven programming, feature oriented programming, imperative programming, semantic-oriented programming, functional programming, genetic programming, logic programming, pattern matching programming and the like.

Terminology

Brief definitions of terms used throughout this application are given below.

The phrase "2D camera" or the term "camera" generally refer to a device for recording visual images in the form of photographs, film and/or video signals.

The phrase "3D sensor" generally refers to a device using a remote sensing technology. A 3D sensor may measure distance by illuminating a target with a laser and analyze the reflected light. Examples of 3D sensors include, but are not limited to, a LiDAR, time of flight camera, structured light camera or laser displacement sensor.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

The phrases "in one embodiment," "according to one embodiment," and the like generally mean the particular feature, structure, or characteristic following the phrase is included in at least one embodiment of the present invention, and may be included in more than one embodiment of the present invention. Importantly, such phrases do not necessarily refer to the same embodiment.

If the specification states a component or feature "may", "can", "could", or "might" be included or have a characteristic, that particular component or feature is not required to be included or have the characteristic.

The term "probe" generally refers to a physical structure with one or more 2D cameras and one or more 3D sensors attached to it.

The term "responsive" includes completely or partially responsive.

The term "robot" generally refers to a mechanical or electro-mechanical machine that may be guided or controlled by a computer program, electronic circuitry and/or a human operator. Non-limiting examples of robots include automated guided vehicles, such as quadracopters, aerial or submersible drones or other remote flying or underwater vehicles. Robots may move by flying, swimming, crawling, using legs, following lines or by being wheel-based.

Figure 2:
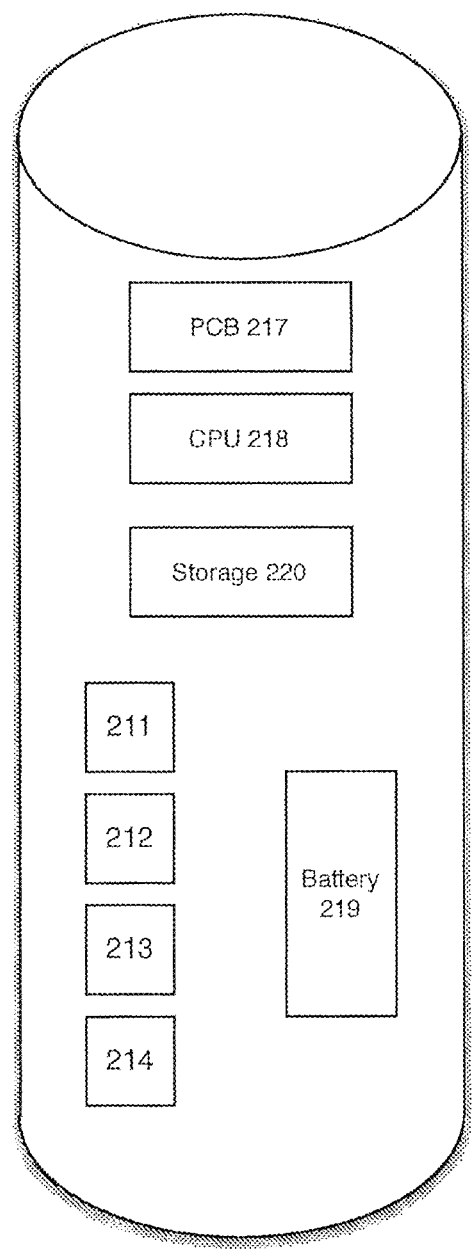
FIG. 2 is a block diagram conceptually illustrating various functional units of an asset inspection robot in accordance with an embodiment of the present invention.

Referring now to FIG. 1 and FIG. 2, an asset inspection robot 100 is illustrated in accordance with an embodiment of the present invention. In the current example, asset inspection robot 100 includes multiple sensors, including one or more 2D cameras 110 and one or more 3D sensors 120. According to one embodiment, cameras and sensors 110 and 120 are arranged in such a way that the intersection of their respective view cones provides image coverage of the entire structure surface being inspected when the robot is moved vertically. Further, cameras and sensors 110 and 120 may be arranged such that their nodal points are in vertical alignment so as to avoid parallax error and provide for proper registration when stitching the captured sensor data together. The robot body 150 is typically shaped in a way that provides for complete imaging with no sensor occlusion.

With continuing reference to FIG. 1 and FIG. 2, as will be appreciated by those skilled in the art, a variety of other sensors may be installed on robot 100 to facilitate collection of additional data. Non-limiting examples of sensors include inertial measurement units (IMUs), orientation sensors, accelerometers, radar guns, metal detectors, voltage detectors, smoke detectors, humistors, flow sensors, depth gauges, gyroscopes, compasses, barometers, thermometers, proximity sensors, motion detectors and gas sensors. In one embodiment, a gas sensor 130 may be employed to detect various gases within the structure being inspected. Additionally or alternatively, a sonar or laser 140 may be used to detect the bottom surface of the structure. Light sources 160 may also be integrated with or attached to robot 100 to provide lighting for the sensors.

FIG. 2 is a block diagram conceptually illustrating various functional units of an asset inspection robot 200 in accordance with an embodiment of the present invention. In the context of the present example, a printed circuit board (PCB) 217 with a microcontroller (not shown) is installed inside robot 200 to control various electromechanical functions. A central processing unit (CPU) 218 is installed inside robot 200 to process sensor data from sensors (e.g., sensors 211, 212, 213 and/or 214) to perform various processing, which is described further below, to prepare the gathered sensor data for human analysis. CPU 218 is also responsible for writing the captured sensor data to a storage mechanism 220. As those skilled in the art will appreciate, storage mechanism 220 may take a variety of forms and may be local or remote. Depending upon the particular implementation, non-limiting examples of appropriate mass storage systems may include one or more hard drives, magnetic tape drives, magneto-optical disc drives, optical disc drives and/or solid-state drives (SSDs). In some embodiments, captured sensor data may be temporarily buffered in a random access memory (RAM) (not shown) within robot 200 and stored remotely from robot 200 by transmitting the captured sensor data by wired or wireless means to a remote site. Robot 200 may be powered by a battery 219 and/or may be connected to an external source of direct or alternating current.

Figure 3:
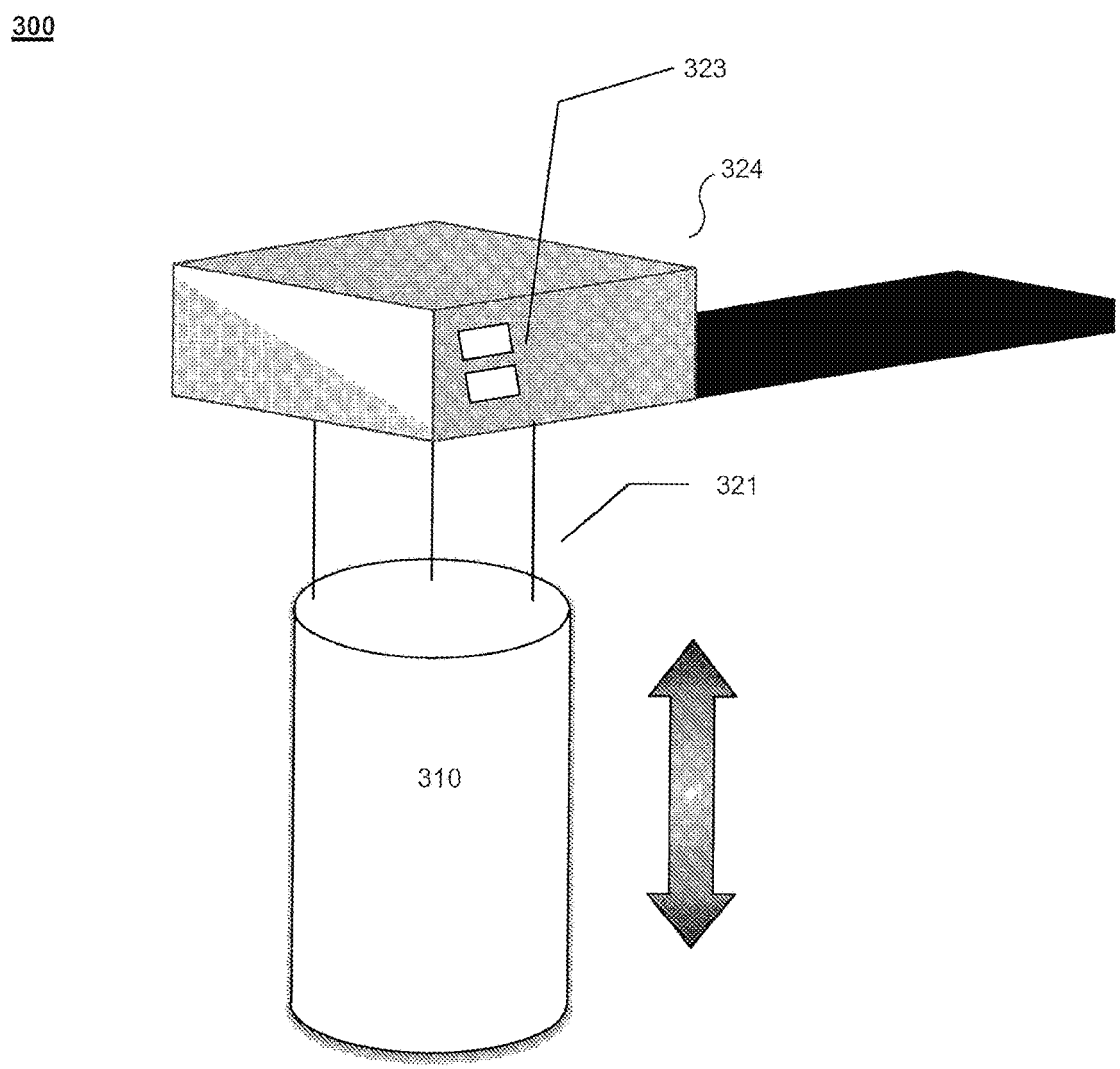
FIG. 3 is a block diagram conceptually illustrating an asset inspection system in accordance with an embodiment of the present invention.

FIG. 3 is a block diagram conceptually illustrating an asset inspection system 300 in accordance with an embodiment of the present invention. In the context of the present example, a robot 310 may be suspended by one or more (e.g., 3) cables or belts 321 and deployed into the structure by a winch system 324 consisting of a motor (not shown) and controls 323. Winch system 324 may be powered by a battery (not shown) or an external source of direct or alternating current. An operator may use controls 323 to automatically lower robot 310 into the structure to perform the inspection. Advantages of various embodiments of the present invention include, without limitation, that they may capture qualitative and quantitative inspection data in a way that is consistent, repeatable, and complete. By using a robot, a human does not have to enter the structure to perform the inspection, and inspections can be performed far more quickly than is typical using conventional inspection methods.

FIGS. 4-6 collectively illustrate a process used to collect asset inspection data and augment this data with human observations for the purpose of analysis in accordance with an embodiment of the present invention. FIG. 4 is a flow diagram illustrating data collection processing in accordance with an embodiment of the present invention. In the context of the present example, the data collection process is described with reference to a tethered probe that uses a vertical arrangement of 2D and 3D sensors. At block 410, the probe is moved into a position such that the bottom most 2D camera is able to image the top most part of the asset.

At block 420, odometry information is read from the encoders and recorded so that the probe can be oriented in real-world space.

At block 430, a 2D image or set of images (video) is captured from the bottom-most 2D camera.

At block 440, if there is a 3D data sensor with view plane overlap to the previously mentioned 2D camera, one or more frames are recorded from this 3D data sensor.

At block 450, data from other sensors, such as IMU data, gas detection data, or any other data type is also recorded.

At decision block 460, it is determined whether the probe is at the bottom of the structure. According to one embodiment, data from a downward facing 3D sensor or a laser dot projected onto the asset bottom may be used to detect whether the probe is at the bottom of the area to be inspected. If so, then data collection processing is complete and at block 470 the scan is terminated and the probe returns to the docked position. Otherwise, data collection processing continues by looping back to block 410 at which point the probe is moved so that the 2D and 3D sensor(s) directly above the aforementioned 2D and 3D sensor(s) are in a position that places their nodal points in the same position as the aforementioned nodal points as described further below with reference to FIG. 8. Data is captured and recorded from all sensors using blocks 420 through 460 as above until the bottom is detected.

FIG. 5 is a flow diagram illustrating data synthesis processing in accordance with an embodiment of the present invention. After all of the data has been collected from a scan during a data collection process (e.g., the data collection process described with reference to FIG. 4), in one embodiment, the collected data is synthesized for later use. According to one embodiment, the purpose of the data synthesis process is twofold. First discrete data sets (2D image frames, 3D data frames, other sensor data, odometry and IMU data, real world data and the like) are linked together. Second, the data is prepared for presentation in software so that a human can augment and/or analyze the data.

At block 510, the odometry and sensor index are defined. Odometry generally refers to encoder data, IMU data, and any other data collected that contribute to defining the position of the probe at the time of the first data set capture as well as the position of each sensor in relation to the probe itself and the other sensors. An example of an encoder is a shaft encoder that counts a fraction of a revolution of a motor shaft or a drive axles of a wheel. Using multiple of such encoders in the context of a differentially steered robot with a pair of drive wheels and a castering tail or nose wheel, for example, allows both velocity and direction of travel (e.g., the heading in degrees) to be determined.

At block 520, the first 2D image captured is related to real-world space using odometry and sensor index information. If other 2D images (e.g., video) have been captured from the same point, these are also related to real-world space. A conceptual illustration of a process for linking data captured from various sensors with a physical point in the real-world is described below with reference to FIG. 7.

At block 530, 3D data frames are related to 2D data. In one embodiment, this is performed using relative sensor position. Because the physical position of the 3D data sensors relative to the 2D cameras is a known physical geometry, each 3D data frame may be accurately related to a 2D data frame. Each point in a 3D data frame can be related to a pixel in the 2D data frame such that a set of points containing both 3D (X,Y,Z) data and 2D data (R, G, B, a) is formed. This process, called UV mapping, may be repeated for all matching 2D and 3D data.

At block 540, any other sensor data is also related to the 2D and 3D data sets using odometry and sensor index.

At decision block 550, it is determined whether there is further data to be processed. If so, then data synthesis processing continues by looping back to block 510; otherwise data synthesis is complete and post processing for display is performed at block 560. After all of the data have been related to real-world space and to each other (linking), the data may be post-processed for display in software. This post-processing may include assembling the 2D images into cube maps or other environment maps, smoothing or blending the 2D images to compensate for exposure differences, concatenating various 3D data sets using odometry and/or algorithmic functions, smoothing other sensor data, etc.

Those skilled in the art will appreciate that while the steps of the data synthesis process are described in a particular order, the steps may be performed in a different order and some step may not be performed at all. For example, in one embodiment, image post-processing may be performed prior to UV mapping.

Figure 9:
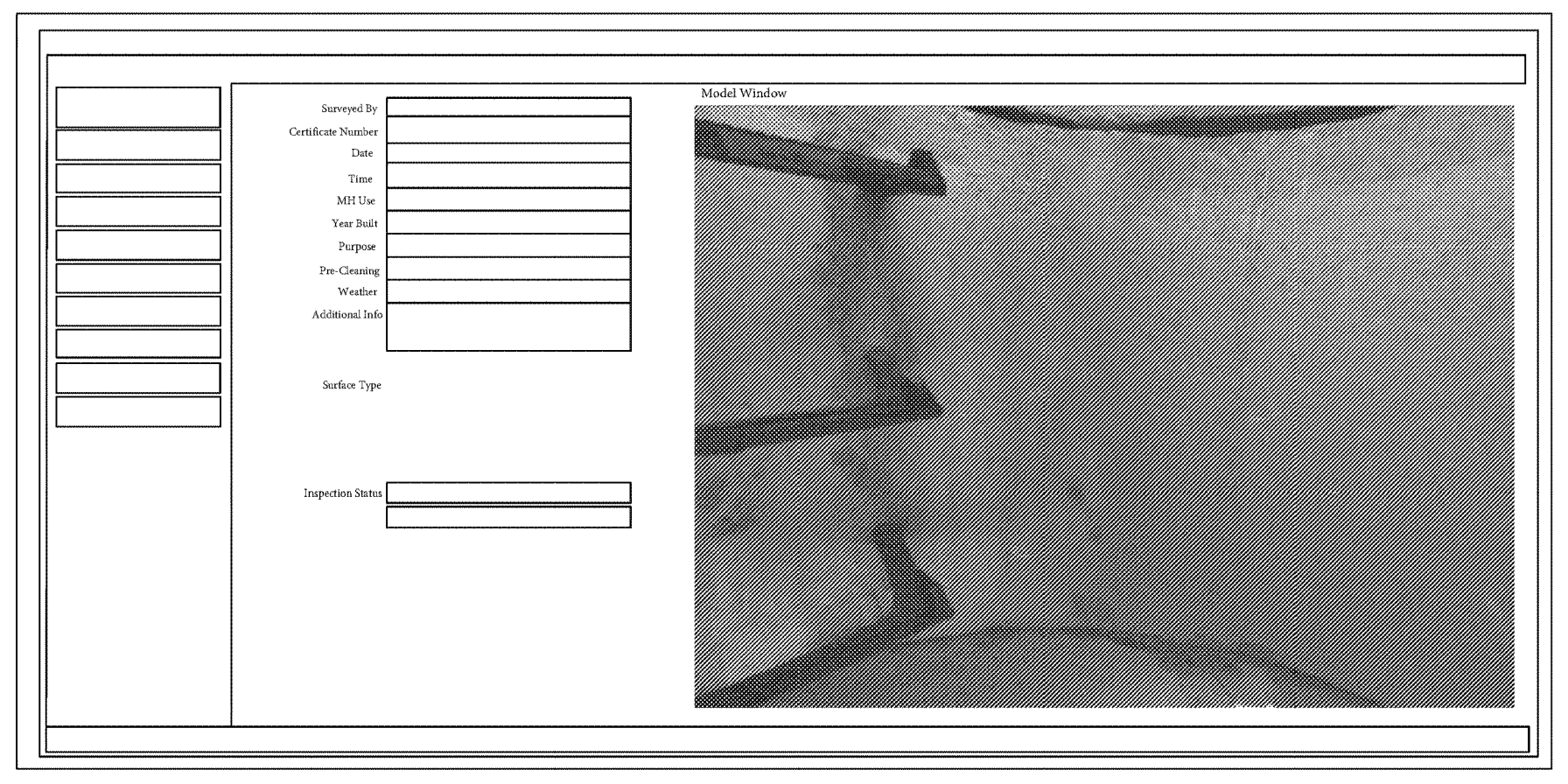

FIG. 6 is a flow diagram illustrating data augmentation processing in accordance with an embodiment of the present invention. In the context of the present example, it is assumed that data is displayed to the user through a software package during the data augmentation process. According to one embodiment, this software package projects the 2D and 3D data in an immersive environment that allows the user to navigate the asset as if the user was looking through a camera at the asset. An exemplary user interface screen, in accordance with an embodiment of the present invention, is illustrated in FIG. 9.

At block 610, the user identifies a region of interest as it is being displayed or projected onto a screen.

At block 620, responsive to receiving an indication that the current software projection contains a region of interest to the user, the view matrix of the software projection may be recorded.

At block 630, the user may enter qualitative data about one or more pixels that are currently projected on the screen. The qualitative data is written to a database by the software package and associated with both the view matrices and the appropriate 2D imagery (including frame numbers if the 2D imagery is video data). In one embodiment, the user is provided with the ability to switch between 2D views, 3D (point cloud) views, flattened views, or any other view as desired. Because the pixels in these views are linked to one another the qualitative data will also be linked to specific view matrices and pixels each view.

At block 640, the user may also measure the distance between one or more pixels in the software projection and another pixel in the same projection or a different projection. For example, if two pixels are selected, the distance between the two pixels in real-world space may be calculated by the software. If more than two pixels are selected, the resulting circle, oval, or polygon may be constructed by the software and relevant geometry in real-world space may be calculated. This data may be written to a database.

At block 650, after the data has been augmented by the user, the resulting 2D images, 3D data, other sensor data, and augmented data may be used to assess the condition of the asset. The user may choose to compare the same point over time (either using video data or two different inspections), compare different points at the same time, compare different points over different times, or perform any other analysis desired.

Figure 7:
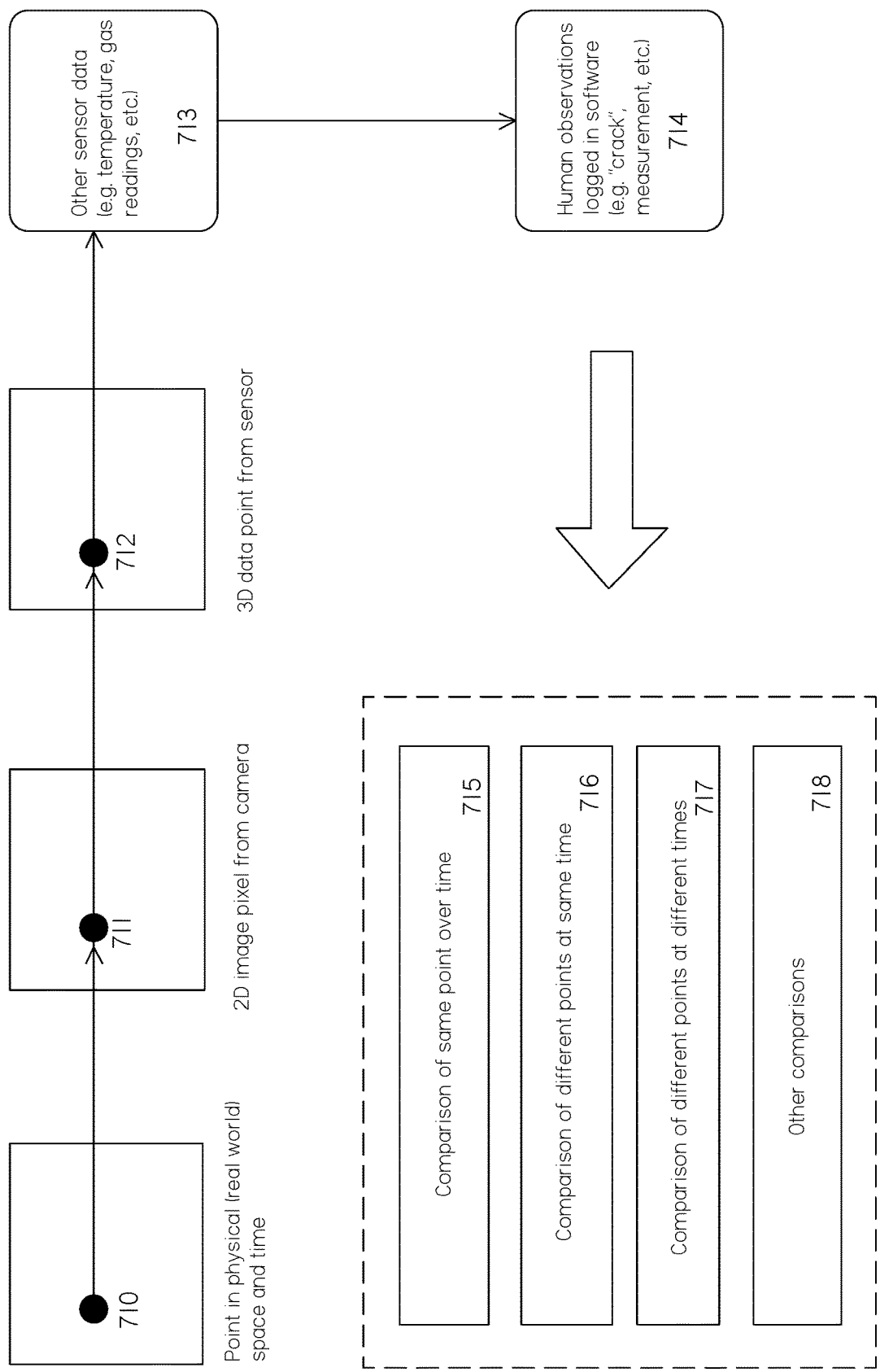
FIG. 7 conceptually illustrates the linking of data captured from various sensors, including 2D cameras and 3D sensors, with a physical point that exists in the real world at a given time in accordance with an embodiment of the present invention.

FIG. 7 conceptually illustrates the linking of data captured from various sensors, including 2D cameras and 3D sensors, with a physical point that exists in the real world at a given time in accordance with an embodiment of the present invention.

A physical asset is made up of many points (e.g., physical point 710), which may be on a surface of the physical asset or which may be below the surface of the physical asset. These points exist at specific locations in the real-world. The physical nature of the points may change or evolve over time. For example, a component of the asset may break down.

A 2D image 711 that includes physical point 710 is captured with a camera. This capture (or, in the case of video, series of captures) occurs in a known time period.

Next, 3D data 712 from a 3D sensor is captured. This 3D data also includes physical point 710 of the asset. The physical orientation of the 3D sensor with respect to the 2D camera is also known.

In certain cases, other data points 713 may also be recorded within the same space and/or time that encompasses physical point 710.

Lastly, a human may augment the data collected about physical point 710 in 711, 712, 713 with qualitative and quantitative observations 714. Qualitative observations may include, but are not limited to, a textual description of point 710, and quantitative observations may include, but are not limited to, measurements of point 710 in relation to other points within the same inspection/asset.

Together, the data collected about physical point 710 in steps 711, 712, 713, and 714 may be used to assess the condition of the asset. Depending upon the particular implementation various comparisons among points may be made available to the end user. For example, a long-range inspection or multiple inspections of the same asset over time allows for comparison of attributes associated with physical point 710 over different time periods. Comparison of two different points 716 at the same time is possible from within the same inspection. Comparison of different points at different times 717 is also possible through long-range or multiple inspections. Other comparisons 718, including, but not limited to, a comparison of physical point 710 to a reference model, may also be utilized to assess the condition of an asset.

Figure 8:
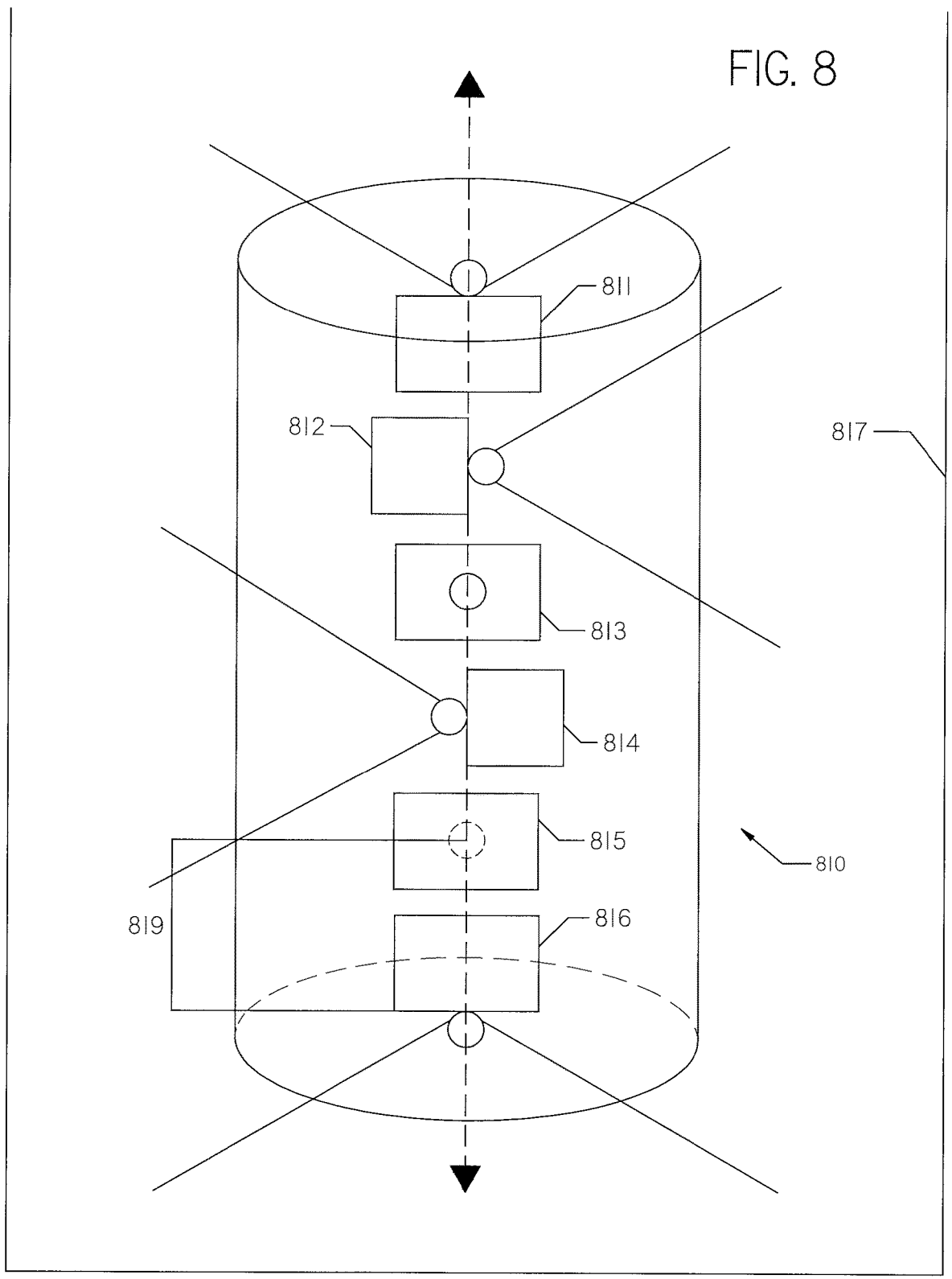
FIG. 8 is a block diagram that conceptually illustrates a method for using multiple cameras to collect images, video, or 3D data from a single nodal point in accordance with an embodiment of the present invention.

FIG. 8 is a block diagram that conceptually illustrates a method for using multiple cameras to collect images, video, or 3D data from a single nodal point in accordance with an embodiment of the present invention. This simplified example uses vertically aligned 2D cameras, however, those skilled in the art will appreciate additional sensors, e.g., 3D sensors, infrared cameras and the like, could be placed within the same alignment. Furthermore, the alignment does not have to be vertical. Horizontal alignment or alignment over any other straight vector may be employed.

In general, it is desirable to collect data from a single nodal point with multiple sensors having overlapping fields of view. FIG. 8 provides a non-limiting concrete example of sensor attributes and relative positioning that may be employed to facilitate the process of co-relating captured sensor data. In the context of FIG. 8, a robot 810 is moved vertically within the interior of a target asset 817 (e.g., a manhole). Robot 810 contains six cameras (811,812,813, 814,815,816) each of which has a field of view greater than 90 degrees. Camera 811 is positioned so that its lens is facing directly up, camera 812 is positioned facing directly outward, camera 813 is positioned facing directly outward rotated 90 degrees with respect to camera 812, camera 814 is positioned facing directly outward rotated 90 degrees with respect to camera 813, camera 815 is positioned facing directly outward rotated 90 degrees with respect to camera 814, and camera 816 is positioned facing directly downward. All cameras are aligned such that their nodal points fall on the same vector. In other embodiments, more or less sensors could be used, but it is desirable to have a sufficient number of sensors and an arrangement thereof that allows complete imaging of target asset 817.

During the data capture process, an image is taken from camera 816, then the robot 810 is moved downward by a known distance 819 between the nodal points of cameras 816 and 815. Next, an image is taken from camera 815. This process repeats until images have been taken from all cameras 811, 812, 813, 814, 815, 816 and the robot 810 has moved the distance between the nodal point of camera 816 and the nodal point of camera 811. The entire process is repeated until the entire asset has been imaged.

It is important to note that the process above represents only 2D still images taken in sequence and spanning an entire camera-to-camera nodal point movement. In other embodiments, video capture may be used and camera data may be captured in any order and with any movement distance. These images and/or video may subsequently be arranged using odometry and presented to the user in a logical way.

Figure 10:
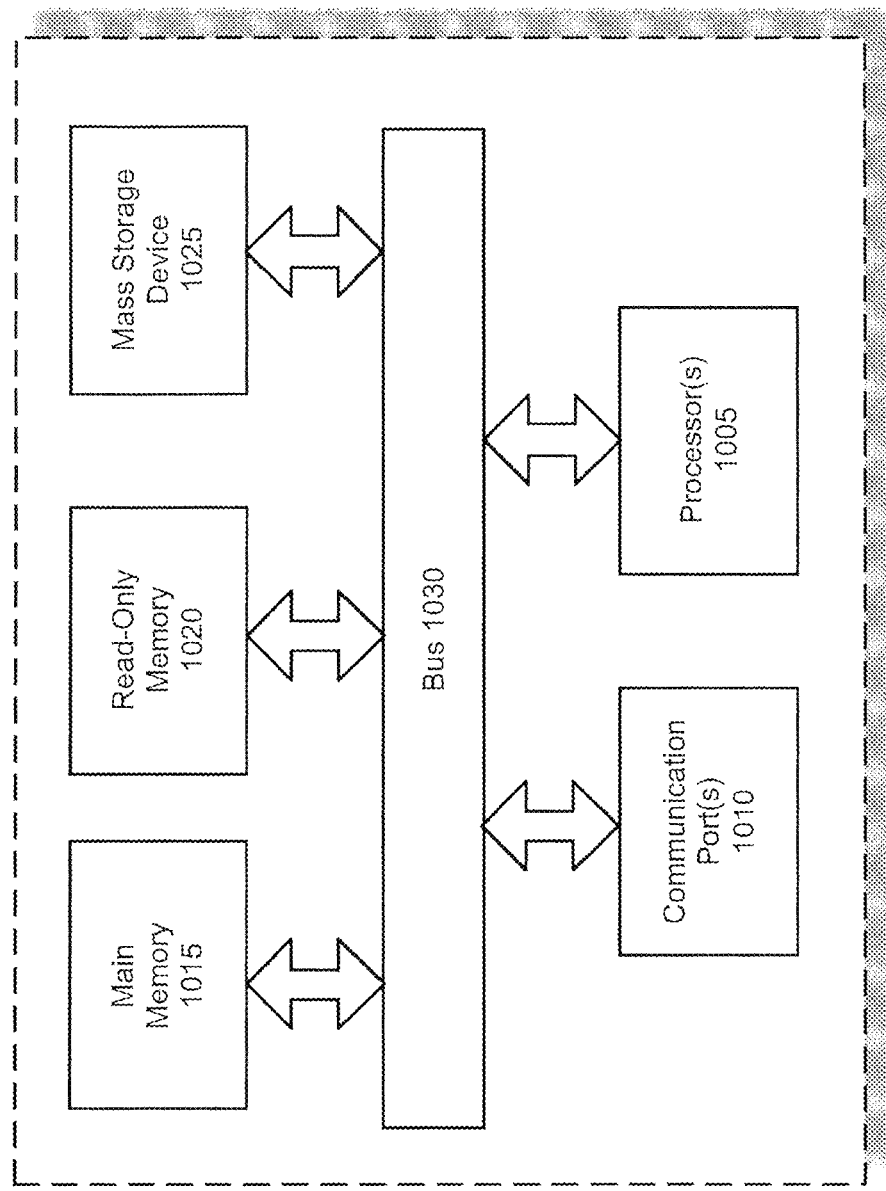
FIG. 10 is an exemplary computer system in which or with which embodiments of the present invention may be utilized.

FIG. 10 is an exemplary computer system 1000 in which or with which embodiments of the present invention may be utilized. Embodiments of the present disclosure include various steps, which have been described above. A variety of these steps may be performed by hardware components or may be tangibly embodied on a non-transitory computer-readable storage medium in the form of machine-executable instructions, which may be used to cause a general-purpose or special-purpose processor programmed with instructions to perform these steps. Alternatively, the steps may be performed by a combination of hardware, software, and/or firmware.

Computer system 1000 may represent or form a part of a client device (e.g., an end-user workstation, a laptop or desktop computer system), a server, a probe or a robot. Computer system 1000 may be part of a distributed computer system (not shown) in which various aspects and functions described herein are practiced. The distributed computer system may include one more additional computer systems (not shown) that exchange information with each other and/or computer system 1000. The computer systems of the distributed computer system may be interconnected by, and may exchange data through, a communication network (not shown), which may include any communication network through which computer systems may exchange data. To exchange data using the communication network, the computer systems and the network may use various methods, protocols and standards, including, among others, Fibre Channel, Token Ring, Ethernet, Wireless Ethernet, Bluetooth, Internet Protocol (IP), IPv6, Transmission Control Protocol (TCP)/IP, User Datagram Protocol (UDP), Delay-Tolerant Networking (DTN), Hypertext Transfer Protocol (HTTP), File Transfer Protocol (FTP), Simple Network Mail Protocol (SNMP), SMS, MMS, Signalling System No. 7 (SS7), JavaScript Object Notation (JSON), Simple Object Access Protocol (SOAP), Common Object Request Broker Architecture (CORBA), REST and Web Services. To ensure data transfer is secure, the computer systems may transmit data via the network using a variety of security measures including, for example, Transport Layer Security (TLS), Secure Sockets Layer (SSL) or a Virtual Private Network (VPN).

Various aspects and functions described herein may be implemented as specialized hardware and/or software components executing in one or more computer systems, such as computer system 1000. Various aspects and functionality described herein may be located on a single computer system or may be distributed among multiple computer systems (e.g., a probe or robot, a server and an end-user workstation) connected to one or more communications networks. For example, various aspects and functions may be distributed among one or more server computer systems configured to provide a service to one or more client computers, or to perform an overall task as part of a distributed system. Additionally, aspects may be performed on a client-server or multitier system that includes components distributed among one or more server systems that perform various functions. Consequently, the various aspects and functions described herein are not limited to executing on any particular system or group of systems. Further, aspects and functions may be implemented in software, hardware or firmware, or any combination thereof. Thus, aspects and functions may be implemented within methods, acts, systems, system elements and components using a variety of hardware and software configurations, and the various aspects and functions described herein are not limited to any particular distributed architecture, network, or communication protocol.

Computer system 1000 may include a bus 1030, a processor 1005, communication port 1010, a main memory 1015, a removable storage media (not shown), a read only memory (ROM) 1020 and a mass storage device 1025. Those skilled in the art will appreciate that computer system 1000 may include more than one processor and more than on communication port.

To implement at least some of the aspects, functions and processes disclosed herein, processor 1005 performs a series of instructions that result in manipulated data. Processor 1005 may be any type of processor, multiprocessor or controller. Some exemplary processors include commercially available processors such as an Intel Xeon, Itanium, Core, Celeron, or Pentium processor, an AMD Opteron processor, a Sun UltraSPARC or IBM Power5+ processor and an IBM mainframe chip. Processor 1005 is connected to other system components, including one or more memory devices representing main memory 1015, ROM 1020 and mass storage device 1025 via bus 1030.

Main memory 1015 stores programs and data during operation of computer system 1000. Thus, main memory 1015 may be a relatively high performance, volatile, random access memory (e.g., dynamic random access memory (DRAM) or static memory (SRAM)). However, main memory 1015 may include any device for storing data, such as a disk drive or other non-volatile storage device. Various examples may organize main memory 1015 into particularized and, in some cases, unique structures to perform the functions disclosed herein. These data structures may be sized and organized to store values for particular data and types of data.

Components of computer system 1000 are coupled by an interconnection element, such as bus 1030. Bus 1030 may include one or more physical busses, for example, busses between components that are integrated within the same machine, but may include any communication coupling between system elements including specialized or standard computing bus technologies including, but not limited to, Integrated Drive Electronics (IDE), Small Computer System Interface (SCSI), Peripheral Component Interconnect (PCI) and InfiniBand. Bus 1030 enables communications of data and instructions, for example, to be exchanged between system components of computer system 1000.

In the context of an end-user workstation, for example, computer system 1000 typically also includes one or more interface devices (not shown), e.g., input devices, output devices and combination input/output devices. Interface devices may receive input or provide output. More particularly, output devices may render information for external presentation. Input devices may accept information from external sources. Non-limiting examples of interface devices include keyboards, mouse devices, trackballs, microphones, touch screens, printing devices, display screens, speakers, network interface cards, etc. Interface devices allow computer system 1000 to exchange information and to communicate with external entities, e.g., users and other systems.

Mass storage device 1025 includes a computer readable and writeable nonvolatile, or non-transitory, data storage medium in which instructions are stored that define a program or other object that is executed by processor 1005. Mass storage device 1025 also may include information that is recorded, on or in, the medium, and that is processed by processor 1005 during execution of the program. More specifically, the information may be stored in one or more data structures specifically configured to conserve storage space or increase data exchange performance. The instructions may be persistently stored as encoded signals, and the instructions may cause processor 1005 to perform any of the functions described herein. The medium may, for example, be optical disk, magnetic disk or flash memory, among others. In operation, processor 1005 or some other controller causes data to be read from the nonvolatile recording medium into another memory, such as main memory 1015, that allows for faster access to the information by processor 1005 than does the storage medium included in mass storage device 1025. A variety of components may manage data movement between main memory 1015, mass storage device 1025 and other memory elements and examples are not limited to particular data management components. Further, examples are not limited to a particular memory system or data storage system.

In the context of an end-user workstation or a server, for example, communication port 1010 may include, but is not limited to, an RS-232 port for use with a modem based dialup connection, a 10/100 Ethernet port, a Gigabit or 10 Gigabit port using copper or fiber, a serial port, a parallel port, or other existing or future ports. Communication port 610 may be chosen depending on a network, such a Local Area Network (LAN), Wide Area Network (WAN), or any network to which computer system 1000 connects. In the context of a probe or a robot, communication ports 1010 may serve as interfaces with various sensors (not shown).

Removable storage media can be any kind of external hard-drives, floppy drives, IOMEGA® Zip Drives, Compact Disc-Read Only Memory (CD-ROM), Compact Disc-ReWritable (CD-RW), Digital Video Disk-Read Only Memory (DVD-ROM).

Although computer system 1005 is shown by way of example as one type of computer system upon which various aspects and functions may be practiced, aspects and functions are not limited to being implemented on computer system 1000. Various aspects and functions may be practiced on one or more computers having a different architecture or components than that shown in FIG. 10. For instance, computer system 1000 may include specially programmed, special-purpose hardware, such as an application-specific integrated circuit (ASIC) tailored to perform a particular operation disclosed herein. While another example may perform the same function using a grid of several general-purpose computing devices running MAC OS System X with Motorola PowerPC processors and several specialized computing devices running proprietary hardware and operating systems.

Computer system 1000 may include an operating system (not shown) that manages at least a portion of the hardware elements included in computer system 1000. In some examples, a processor or controller, such as the processor 1005, executes the operating system. Non-limiting examples of operating systems for an end-user workstation or a server include a Windows-based operating system, such as, Windows NT, Windows 2000 (Windows ME), Windows XP, Windows Vista or Windows 7 operating systems, available from Microsoft Corporation, a MAC OS System X operating system available from Apple Inc., one of many Linux-based operating system distributions, for example, the Enterprise Linux operating system available from Red Hat Inc., a Solaris operating system available from Sun Microsystems, or a UNIX operating systems available from various sources. Many other operating systems may be used.

Processor 1005 and operating system together define a computer platform for which application programs in high-level programming languages may be written. These applications may be executable, intermediate, bytecode or interpreted code, which communicates over a communication network, for example, the Internet, using a communication protocol, for example, TCP/IP. Similarly, aspects may be implemented using an object-oriented programming language, such as .Net, SmallTalk, Java, C++, Ada, or C# (C-Sharp). Other object-oriented programming languages may also be used. Alternatively, functional, scripting, or logical programming languages may be used.

Additionally, various aspects and functions may be implemented in a non-programmed environment, for example, documents created in Hypertext Markup Language (HTML), eXtensible Markup Language (XML) or other format that, when viewed in a window of a browser program, can render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Accordingly, the functional components disclosed herein may include a wide variety of elements, e.g. specialized hardware, executable code, data structures or objects, that are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user mode application) or in a commonly shared data structure (such as an application registry that is defined by an operating system). In addition, some examples provide for both system and user interfaces that allow external entities to modify the parameters and thereby configure the behavior of the components.

Components described above are meant only to exemplify various possibilities. In no way should the aforementioned exemplary computer system limit the scope of the present disclosure.

While embodiments of the invention have been illustrated and described, it will be clear that the invention is not limited to these embodiments only. Numerous modifications, changes, variations, substitutions, and equivalents will be apparent to those skilled in the art, without departing from the spirit and scope of the invention.

The invention claimed is:

1. A method of using a suspended probe carrying onboard first and second cameras, an odometer, a 3D sensor, and a central processing unit, the onboard first and second cameras having vertically aligned nodal points and a fixed separation distance, and further carrying an odometer, the method comprising:
    using the first camera to produce one or more images of a physical asset;
    raising or lowering the suspended probe by the fixed separation distance; and
    using the second camera to produce one or more images, in which the steps are carried out within an underground vertical structure, in which a human may enter the vertical structure through a manhole;
    recording odometer data as the probe is raised or lowered;
    using the 3D sensor to capture one or more 3D data frames of the physical asset as the probe is raised or lowered;
    performing a data synthesis process including:
        using the central processing unit to link the odometer data to the one or more produced images and the one or more 3D data frames;
        using the central processing unit to associate the one or more produced images and the one or more 3D data frames with a physical point in real-world space based on the odometry data;
        relating the one or more produced images to the 3D data frames by relating a point in each 3D data frame to a pixel in each of the one or more images based on a known physical geometry of the positioning of the 3D sensor relative to the first and second cameras;
    displaying the synthesized data to a user as a 3D computer graphics model; and
    measuring a distance between a first point and a second point on the displayed 3D graphics model.

2. The method of claim 1 in which the probe is suspended from one or more flexible cables and is lowered by extending the one or more flexible cables.

3. The method of claim 1 in which the fields of view of the first and second cameras differ, but overlap, when positioned at the same nodal point.

4. The method of claim 1 in which at least one of the first and second cameras has a field of view greater than 90 degrees.

5. The method of claim 2 in which extension of the at least one cable is controlled by a winch supported at a location remote from the probe.

6. The method of claim 1 in which the first camera and the second camera are axially spaced along a longitudinal axis, in which first camera has a first field of view and the second camera has a second field of view, and in which the second field of view is angularly offset about the longitudinal axis from the first field of view.

7. The method of claim 6 in which the angular offset is 90 degrees.

8. The method of claim 1, in which the fixed separation distance between the first and second cameras is consider a first fixed separation distance, and in which the suspended probe further carries an onboard third camera having a nodal point that is vertically aligned with the nodal points of the first and second cameras and is spaced from the second camera by a second fixed separation distance, the method further comprising:
    after the second camera produces one or more images, raising or lowering the suspending probe by the second fixed separation distance; and
    using the third camera to produce one or more images.

9. The method of claim 1, in which the physical asset is the vertical structure.

10. A method of using a suspended probe carrying onboard first and second cameras having vertically aligned nodal points and a fixed separation distance, in which the suspended probe further carries an odometer, a 3D sensor, and a central processing unit, the method further comprising:
    using the first camera to produce one or more images of a physical asset;
    raising or lowering the suspended probe by the fixed separation distance; and
    using the second camera to produce one or more images of the physical asset; in which the steps are carried out within an underground vertical structure, in which a human may enter the vertical structure through a manhole;
    recording odometer data as the probe is raised or lowered;
    using the 3D sensor to capture one or more 3D data frames of the physical asset as the probe is raised or lowered; and
    performing a data synthesis process including:
        using the central processing unit to link the odometer data to the one or more produced images and the one or more 3D data frames;
        using the central processing unit to associate the one or more produced images and the one or more 3D data frames with a physical point in real-world space based on the odometry data; and
        relating the one or more produced images to the 3D data frames by relating a point in each 3D data frame to a pixel in each of the one or more images based on a known physical geometry of the positioning of the 3D sensor relative to the first and second cameras;
    displaying the synthesized data to a user as a 3D computer graphics model;
    measuring a distance between a first point and a second point on the displayed 3D graphics model;
    observing an area of interest on the 3D computer graphics model; and
    thereafter, performing the above steps a second time using the same physical asset so as to display a new set of synthesized data to the user as a new 3D computer graphics model, and so as to observe the area of interest on the new 3D computer graphics model.

* * * * *